Oct. 17, 1967 M. SCHLICHTE 3,348,202

LINKING CIRCUITS FOR TELEPHONE SYSTEMS COMPRISING TRANSFORMERS UTILIZING ONLY THE LINEAR WORKING RANGE THEREOF

Original Filed Aug. 14, 1962 2 Sheets-Sheet 1

3,348,202

LINKING CIRCUITS FOR TELEPHONE SYSTEMS COMPRISING TRANSFORMERS UTILIZING ONLY THE LINEAR WORKING RANGE THEREOF

Max Schlichte, Munich, Germany, assignor to Siemens Aktiengesellschaft, Berlin and Munich, Germany Continuation of application Ser. No. 216,769, Aug. 14, 1962. This application May 2, 1966, Ser. No. 547,126
Claims priority, application Germany, Aug. 18, 1961, S 75,352; Sept. 19, 1961, S 75,824
8 Claims. (Cl. 340—166)

ABSTRACT OF THE DISCLOSURE

A linking circuit formed of an input transformer, an output transformer and a ring modulator circuit and wherein the input transformer includes a primary winding and a plurality of secondary windings and the output transformer includes at least a pair of input windings wound in opposition to one another and at least a pair of output windings wound in opposition to one another. The ring modulator circuit includes a plurality of diodes connected in a ring between the secondary windings and the input windings. A readout impulse is supplied to the primary winding of the input transformer and a pair of input impulses are supplied to the pair of input windings of the output transformer.

This is a continuation of application Ser. No. 216,769 filed Aug. 14, 1962, and now abandoned.

The invention disclosed herein relates to circuits for processing messages which are supplied in the form of binary signals. Such binary signals can assume two different values which are often designated as O and L. The processing leads to a linking of the various supplied signals, resulting likewise in a binary signal. Circuits of this kind are hereinafter designated as linking circuits. The invention is more particularly concerned with linking circuits for telephone systems comprising transformers utlizing only the linear working range.

Linking circuits having very definite linking functions are referred to, for example, as Or-gate circuits, exclusive Or-gate circuits, And-gate circuits, etc. Many different embodiments of such linking circuits are known, which are constructed with the aid of various switching elements. These linking circuits may also differ with respect to the mode of operation thereof. Thus, there are linking circuits which deliver the result signal for the entire time of the presence of the signals which are to be linked. These are statically operating linking circuits which are constructed, for example, with the aid of resistors and rectifiers. However, linking circuits can also be operated impulse-wise instead of in static manner. In such case, the signal which signifies the result of the linking, the result signal, is represented by a more or less short impulse or by the absence of such impulse. Linking circuits of this kind are often constructed with the aid of transformers, usually ring cores, having windings comprising a few turns. The core of such a transformer consists in the known circuits predominently of a ferromagnetic material with rectangular magnetizing loop. The two remanence points of the magnitizing loop are, for example, utilized for marking the two conditions of the binary signals (see Nachrichtentechnische Zeitschrift (NTZ), 1957, No. 8, page 391). This applies particularly to the signal representing the result of the linking of supplied signals.

There are also circuits known for processing more than two binary signals; see, for example, German Patent No. 968,205, German Auslegeschrift (DAS) 1,098,540 and U.S. Patent 2,691,193. In such cases, there are provided a plurality of transformers having cores of ferromagnetic material with rectangular magnetizing loop. The signals which are to be processed are in the form of impulses individually conducted to different series circuits of windings, the result being delivered from a winding of the respective transformers.

It is in connection with involved message processing systems desirable to use linking circuits which are adapted to deliver extraordinarily quickly the desired linking result. It must be considered in this connection that a very short time interval is generally available for carrying out such linkings, which is particularly true in the case of telephone systems in which the linking results are used for initiating other functions, and wherein these linking results must often be delivered at accurately determined instants. In case of the above mentioned linking circuits, the transformer cores must change their remanence condition incident to the processing of the signals supplied thereto. As has been found, a given minimum time interval is in any case required for this purpose, such interval limiting the attainable operating speed of such circuits.

The invention points a way toward constructing linking circuits which operate extraordinarily rapidly and which are therefore adapted to deliver the linking result already in fractions of micro seconds. Only the linear part of the magnetizing curve of the core material of the transformers is being utilized, so that it is unnecessary to trigger the magnetizing curve through to the saturation range. There are provided windings to which are conducted the signals to be processed, and special windings which deliver the result signals. The advantage resulting therefrom resides in that there is obtained an electrical separation between the circuits over which are supplied the signals to be linked and the circuits over which are delivered the result signals.

The circuit arrangement according to the invention is therefore concerned with a circuit for linking two or more binary signals or signal elements to effect the delivery of at least one binary result signal, employing transformers provided with a plurality of windings, the secondary windings of which are serially connected, and which need be triggered, in effecting the linking, merely in the linear part of the magnetizing curve. The particular features of this linking circuit reside in that a single transformer is individually allocated to each binary signal which is to be processed, that input impulses in one or the other direction are conducted to the primary windings of the respective transformers according to the binary values of the binary signals to be processed, so that impulses in one or the other direction are induced in each case in the secondary windings, that the sense of winding and the distribution of secondary windings over the transformers are selected according to the desired linking function, and that the series circuits thereof extend to at least one output of the linking circuit, where the result signal signifying linking result is delivered, such result signal being represented by the appearance of non-appearance of output impulses of definite polarity and amplitude.

The remanence of the magnetic core material is not utilized since the linking circuit according to the invention has to operate merely in the linear portion of the magnetizing curve. It is therefore in the execution of the linking functions unnecessary to provide for special restoring impulses for the purpose of obtaining prior to the linking of signals a definite magnetic initial condition of the core material. Since the remanence of the magnetic core material is not utilized, it is likewise unnecessary to trigger the magnetizing curve to its remanence points. The triggering of the magnetizing curve is therefore always very quickly concluded, making it possible to obtain, with the linking circuits according to the invention, very high operating speeds. Owing to the great change of the magnetic flux ($-d\phi/dt$) connected therewith, there will be obtained voltages in the secondary windings, which can be well evaluated, even when using small ring cores with only a few turns or only one turn per winding. All these advantages make it possible to use the linking circuit according to the invention in many circumstances.

Details will now be described with reference to the accompanying drawing showing a number of examples of linking circuits according to the invention.

A particular method of circuit representation is being used which will be explained with the aid of FIG. 1;

Figure 1:
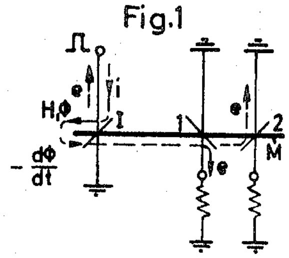

The circuit representation utilized herein will be explained first with reference to FIG. 1, attention being in this connection also called to Proceedings of the IRE, May 1955, page 527 et seq. The core of the transformer is indicated by the prominent horizontally extending line M. This line is perpendicularly crossed by windings I, 1 and 2. The sense of direction of the respective windings is indicated by angularly directed lines passing through the corresponding crossing points. Windings marked by angularly identically slanting lines are wound in identical sense of direction, while windings marked by lines extending perpendicularly thereto are wound in opposite sense of direction. The polarity of an impulse induced in a winding can be determined by the angular line associated therewith. For example, when a positive current impulse *i* is supplied to the winding I, as indicated in FIG. 1, a voltage will be induced in this winding, the polarity of which is opposite to that which produces the current impulse *i*. A voltage with such polarity is also induced in other windings, such as winding 2, which have the same sense of direction as the winding I, as indicated by the angular line crossing the winding 2 which extends in parallel with the angular line crossing the winding I. The appearance of induced voltages is indicated by arrows marked by the letter *e*. Assuming the winding 2 to be included in a circuit, a current impulse will flow therethrough in the direction indicated by the arrow *e*. The winding 1, as indicated by the angular crossing line, is wound in a sense of direction opposite to that of the windings I and 2. The arrow *e* shown in connection with such winding 1 therefore points in opposite direction. The angularly directed lines which indicate the sense of winding direction of the respective windings, can also be considered as mirrors for the direction of the electrical values involved. Upon mirroring at the angular line of the winding I the direction of the supplied impulse *i*, there will be obtained the direction of the magnetic field strength H and the magnetic flux $\phi$ in the core. The direction of the flux change which is equal to $-d\phi/dt$ and effective to induce a voltage in a winding, is then oppositely directed. Upon mirroring this direction at the angular line of a winding, there will be obtained the polarity of the induced voltage impulse and the direction of the impulse current flowing through the respective winding. These mirrorings are in FIG. 1 indicated by dotted lines referenced in accordance with the above indicated markings.

Figures 2, 3, 4, 5:
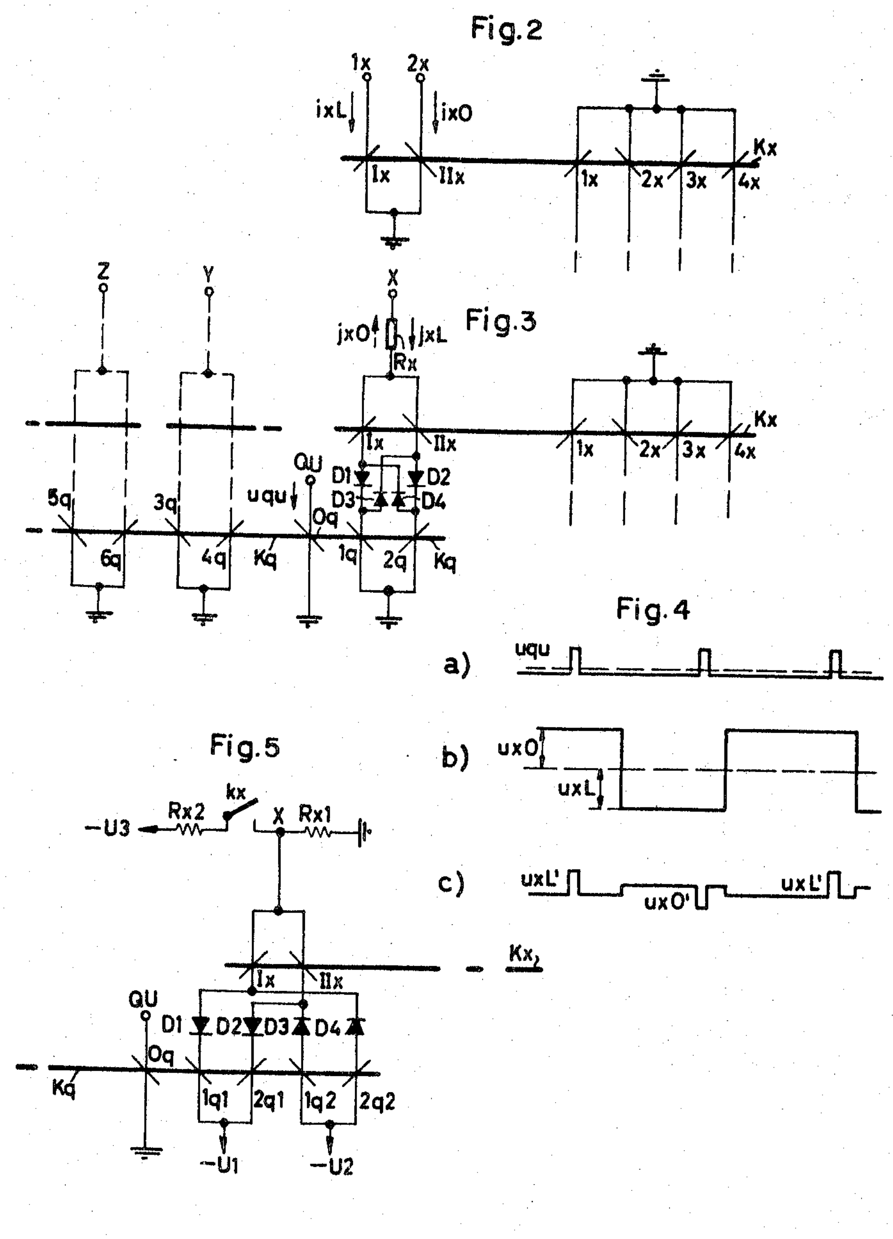
FIGURE 2 is a schematic diagram of a linking circuit for supplying binary signals.
FIGURE 3 is a schematic diagram of a linking circuit constructed in accordance with the principles of the present invention for supplying binary signals.
FIGURE 4 illustrates waveforms of input and output signals of the circuit illustrated in FIGURE 3.
FIGURE 5 illustrates a schematic diagram of another embodiment of the linking circuit constructed in accordance with the principles of the present invention for supplying binary signals.

FIG. 2 shows a transformer of a linking circuit which is provided with two such primary windings. The transformer comprises the core K*x*, primary windings I*x* and II*x* and a plurality of secondary windings which are indicated at 1*x* . . . 4*x*. The inputs are indicated at 1X and 2X. According to the binary value of the signal which is to be supplied, an impulse is over the input 1X or over the input 2X extended in the direction indicated by the arrow *ix*L and *ix*O. Impulses in one or the other direction are thereby as intended, induced in the secondary windings.

In order to achieve in the linking circuits according to invention the desired course of the linking operation, the signals or signal elements which are to be linked, are to be supplied, as already mentioned, in the form of impulses. These impulses must have definite duration and amplitude so that they can be effective in the intended manner. In order to reliably obtain the correct linking result, the signals shall also be supplied simultaneously as accurately as possible. Care must therefore be taken to comply with these requirements concerning the supply of impulses. The linking circuits according to the invention, owing to the otherwise very favorable features thereof, can also be advantageously used in case the signals to be linked which are not from the outset supplied in the proper form, namely, as simultaneously appearing impulses with given amplitude. However, special measures are to be taken in such a case to impart to the signals the required shape and position as to time. The signals will often vary somewhat with respect to duration and amplitude, owing to peculiarities of the signal source. It is in such cases advisable to conduct the input impulses to a circuit which is especially adapted for accurately dimensioning the amplitude and the position thereof as to time.

For example, such a circuit may be in the form of a ring modulator circuit with an input transformer and an output transformer connected over four rectifiers which are circuited in the ring. This ring modulator circuit is to be operated so that a readout impulse, which is common to all ring modulator circuits, is conducted to the primary winding of the input transformer for triggering the linking, such readout impulse being extended or not extended as an input impulse, to the primary winding of the output transformer, depending upon the polarity of an input signal voltage related to the respective signal which is to be processed, and controlling the operation of the rectifiers, which voltage is placed on the secondary windings of the input transformer and on the primary windings of the output transformer. The output transformer serves here at the same time as carrier for serially circuited secondary windings which serve for effecting the desired linking funtion.

A ring modulator circuit of this kind is shown in FIG. 3. The input repeater comprises the transformer core K*q* and the output repeater comprises K*x*. The readout impulse is supplied over the terminal QU of the primary winding O*q* of the input transformer. Its secondary windings 1*q* and 2*q* are connected with the primary windings I*x* and II*x* of the output transformer, over the rectifiers D1 and D2 as well as over the rectifiers D3 and D4. The rectifiers are controlled by the input signal voltage which is placed on the connecting point of the secondary windings 1*q* and 2*q* of the input transformer and on the connecting point of the primary windings I*x* and II*x* of the output transformer. The connecting point between the secondary windings 1*q* and 2*q* of the input transformer is connected to ground. The connecting point between the primary windings I*x* and II*x* of the output transformer is over the current limiting resistor R*x* connected with the terminal X, such terminal serving as signal input to which is conducted, depending upon the binary value of the signal to be supplied, either a positive impulse indicated by the arrow *jx*L or a negative impulse indicated by the arrow *jx*O. In case a positive impulse is supplied, the rectifiers D1 and D2 will be conductive for the duration thereof while the rectifiers D3 and D4 will be in blocking or cutoff condition. When a positive readout impulse is now extended over the terminal QU of the primary winding O*q*, during the presence of the input impulse, the impulses induced in the secondary windings 1*q* and 2*q*, which are added up in identical sense, will merely cause a current flow over the rectifiers D1 and D2 provided that the amplitude of the readout impulse is not too great. Accordingly an impulse of given direction is also extended to the primary windings I*x* and II*x*, the position of such impulse as to time and the amplitude thereof depending solely upon the readout impulse. In the event that the respective input signal impulse is a negative impulse, the rectifiers D1 and D2 will be in blocking condition while the rectifiers D3 and D4 will be conductive. A readout impulse now supplied, therefore merely causes a current flow over the rectifiers D3 and D4. These rectifiers are so disposed in the circuit that the primary windings I*x* and II*x* will now receive an impulse oriented in opposite direction. The position of this impulse as to time and the amplitude thereof likewise depend solely upon the readout impulse. The impulses in the primary windings I*x* and II*x*, which impulses are related to the readout impulses, add up in such windings in identical sense, on account of the correspondingly selected circuitry of said windings, and produce further impulses in the secondary windings 1*x*, 2*x* . . . of the output transformer, such further impulses being evaluated for the linking. However, the input signal impulses are compensated in the series circuit of the primary windings I*x* and II*x* and therefore do not cause any impulses in the secondary windings 1*x*, 2*x* . . . nor, for the same reasons, over the secondary windings 1*q* and 2*q*, in any further windings of the input transformer.

The above described operational conditions are additionally shown in FIG. 4 in the form of curves (*a*)–(*c*). The curve (*b*) shows the sequence of voltages *ux*O and *ux*L of the positive and negative input signal impulses at the terminal X (FIG. 3). The curve (*a*) shows the appearance at the terminal QU of the voltage *uqu* related to readout impulses. The curve (*c*) shows the position as to time and the polarity of the voltage impulses *ux*L′ and *ux*O′ produced by the action of readout pulses in a secondary winding on the repeater core K*x*. The polarity of these impulses changes with the polarity of the input signal impulses; however, the amplitude and the position as to time thereof depends solely upon the action of the readout impulses. Accordingly, given alterations of the input signal impulses will not affect the operation of the linking circuit. Conducting a readout impulse in common to all ring modulator circuits provided in a linking circuit, will assure that the impulses which are to be evaluated are simultaneously induced in all secondary windings of the transformers serving for the linking, thus also assuring unobjectionable completion of the desired linking.

The ring modulator circuits to which a readout impulse is conducted in common are appropriately provided with a common input transformer having a single primary winding. Upon this transformer are in such case provided a plurality of pairs of secondary windings which are respectively individually allocated to the corresponding ring modulator circuits. This is also indicated in FIG. 3 which shows that there are upon the transformer core K*q*, in addition to the pair of secondary windings 1*q* and 2*q*, further pairs of secondary windings 3*q*, 4*q* and 5*q*, 6*q*. The ring modulator circuits, corresponding respectively to these last noted pairs of secondary windings, are provided with the inputs Y and Z. It will be in most cases sufficient to provide only one pair of secondary windings. The pairs of rectifiers assigned to the various ring modulator circuits are in such case appropriately connected to this one pair of secondary windings.

A variant of the ring modulator circuit represented in FIG. 3 is shown in FIG. 5 which distinguishes therefrom in that the secondary windings of the input transformer is subdivided or split to form first secondary windings 1*q*1 and 2*q*1 and second secondary windings 1*q*2 and 2*q*2, which are separately connected with the primary windings I*x* and II*x* of the output transformer, respectively over rectifiers D1, D2 and D3, D4. Depending upon the applied input signal voltage, only the rectifiers D1, D2 connected to the first two secondary windings 1*q*1, 2*q*1 or only the rectifiers D3, D4 connected to the second two secondary windings, will be conductive. The input signal voltage is supplied (applied) over the connecting point between the primary windings I*x* and II*x* of the output transformer and over the connecting points respectively between the secondary windings 1*q*1, 1*q*2 and 1*q*2, 2*q*2 of the input transformer. The respective primary windings are over a resistor placed on a potential which varies according to the input signal, and the respective secondary windings are placed on constant but different potential lying between the potentials which appear at the primary windings and being so selected that the difference determines the permissible magnitude of the amplitude of readout pulses. The circuit is in the present case such that ground potential or negative potential −U3 appears at the primary windings. Ground potential is in normal or resting condition extended over the resistor R*x*1 while the negative potential −U3 is with closed contact *kx* extended over the resistor R*x*2. At the secondary windings are the less negative potentials −U1 and −U2, the latter of these two potentials being more negative.

Ground potential over the resistor R*x*1 will effect the ring modulator circuit when the contact *kx* is in the open position in which it is shown. The rectifiers D3 and D4 are accordingly in cutoff or blocking condition and the rectifiers D1 and D2 are conductive. At one terminal of each of the rectifiers D3 and D4 is the potential −U2 and at the other terminals thereof is the potential −U1 which is extended thereto over the rectifiers D1 and D2. Accordingly, there is blocking voltage on the rectifiers D3 and D4, such voltage corresponding to the difference between the potentials −U1 and −U2. The voltage which is in a given case induced in the secondary windings of the input transformer must not exceed this blocking voltage. Accordingly, the amplitude of the input signal impulse can be of corresponding magnitude. In the event that the secondary windings 1*q*1, 2*q*1, 1*q*2, 2*q*2 have the same number of turns as the primary winding O*q*, the amplitude of the readout impulse may correspond to the magnitude of this blocking voltage.

When the contact *kx* is closed, the potential −U3, instead of ground potential, will be effective with respect to the ring modulator circuit. The rectifiers D1 and D2 are in such a case in blocking condition while the rectifiers D3 and D4 are conductive. At the rectifiers D1 and D2 will then be the blocking voltage such as had been before on the rectifiers D3 and D4, namely, a voltage corresponding to the difference between the potentials −U1 and −U2. The same permissible amplitude will then result for the readout impulse. The particular advantage of the circuit shown in FIG. 5 resides in that the permissible amplitude of the readout impulses is determined by the potentials placed on the secondary windings irrespective of the properties of the rectifiers employed.

The readout impulses conducted to the readout circuits are advantageously also used for producing the blocking voltages for the rectifiers, which voltages are in given cases placed on the respective linking circuit. Upon using for this purpose peak rectification and appropriate amplification, there will be obtained blocking voltages which depend upon the amplitude of the readout impulses. This will necessarily assure that the blocking voltages are matched to the amplitude of the readout impulses, thus being always of the correct magnitude. Fluctuations of the amplitude of the readout impulses therefore cannot cause any disturbances of the linking function.

The above described ring modulator circuits enable extension of continuously present signals or of signals occurring in the form of impulses, and such circuits therefore can also be used as readout circuits in connection with an arrangement in which the value L is represented by the delivery of impulses while the value O is represented by the absence of impulses.

It is possible, in connection with linking circuits constructed according to the invention, to reduce the number of windings without altering the circuit functions, thereby advantageously obtaining savings so far as windings are concerned. The particular feature of such linking circuit resides in that a single secondary winding which is inserted in all respectively associated series circuits, is used in place of a plurality of secondary windings with identical sense of winding direction and identical number of turns, which otherwise have to be placed upon the same transformer.

Changes may be made within the scope and spirit of the appended claims which define what is believed to be new and desired to have protected by Letters Patent.

The invention claimed is.

1. A linking circuit comprising:

(a) an input transformer having a primary winding,
(b) an output transformer having a pair of primary windings wound in opposition to one another,
(c) means connecting a readout pulse to the primary winding of said input transformer,
(d) means connecting an input pulse to the primary windings of said output transformer,
(e) means coupled with said input transformer and said primary windings of said output transformer for additively coupling said readout pulse to the input pulse in one of the primary windings of said output transformer and subtractively coupling said readout pulse to the input pulse in the other primary winding of output transformer, and
(f) output means connected to said output transformer for producing an output pulse in response to the simultaneous application of a readout pulse and an input pulse and having a polarity indicative of the polarity of said input pulse.

2. The linking circuit as defined in claim 1 wherein said coupling means includes a first secondary winding on said input transformer and means electrically connecting said one primary winding of said output transformer to said first secondary winding only in response to the input pulse having one polarity.

3. The linking circuit as defined in claim 1 wherein said coupling means includes a first secondary winding on said input transformer and a first rectifier connected between said first secondary winding and said one primary winding of said output transformer.

4. The linking circuit as defined in claim 3 wherein said coupling means includes a second rectifier connected in an opposite sense to the conducting direction of said first rectifier between said first secondary winding and the other of said primary windings of said output transformer.

5. The linking circuit as defined in claim 3 wherein said coupling means includes a second secondary winding on said input transformer and a second rectifier connected in an opposite sense to the conducting direction of said first rectifier between said second secondary winding and said one primary winding of said output transformer.

6. The linking circuit as defined in claim 5 wherein said coupling means includes a third and a fourth rectifier, said third rectifier connected in the opposite sense to the conducting direction of said first rectifier between said first secondary winding and the other of said primary windings of said output transformer, said fourth rectifier connected in the opposite sense to the conducting direction of said second rectifier between said second secondary winding and said other primary winding of said output transformer.

7. The linking circuit as defined in claim 5 wherein said coupling means includes a third and a fourth secondary winding on said input transformer and a third and a fourth rectifier, said third rectifier connected in an opposite sense to the conducting direction of said first rectifier between said third secondary winding and the other of said primary windings of said output transformer, said fourth rectifier connected in an opposite sense to the conducting direction of said second rectifier between said fourth secondary winding and said other primary winding of said output transformer.

8. A linking circuit comprising:

(a) an input transformer having a primary winding and a pair of secondary windings wound in opposition to one another,
(b) an output transformer having a pair of primary windings wound in opposition to one another and a secondary winding,
(c) means supplying a readout pulse to the primary winding of said input transformer,
(d) means supplying an input pulse to the primary windings of said output transformer,
(e) means electrically connecting one secondary winding of said input transformer to one primary winding of said output transformer and the other secondary winding of said input transformer to the other primary winding of said output transformer in response to the input pulse having one polarity, and
(f) means electrically connecting the one secondary winding of said input transformer to the other primary winding of said output transformer and the other secondary winding of said input transformer to the one primary winding of said output transformer in response to the input pulse having a polarity opposite from the one polarity.

References Cited

UNITED STATES PATENTS

| | | | |
|---|---|---|---|
| 3,123,816 | 3/1964 | Schramel et al. | 340—347 |
| 3,141,158 | 7/1964 | Minnick et al. | 340—88 X |
| 3,277,308 | 10/1966 | Ptacnik | 307—88 |
| 3,278,916 | 10/1966 | Kiseda et al. | 340—174 |

OTHER REFERENCES

IBM Technical Disclosure Bulletin, "Memory Address Decoder," G. Constantine, Jr., vol. 3, #1, June 1960, pp. 49, 50 (copy in 307–88).

NEIL C. READ, *Primary Examiner.*

D. YUSKO, *Assistant Examiner.*